May 12, 1959     N. F. BECK     2,886,073
APPARATUS FOR FILLING A CASING WITH FOOD PRODUCTS
Filed March 12, 1957
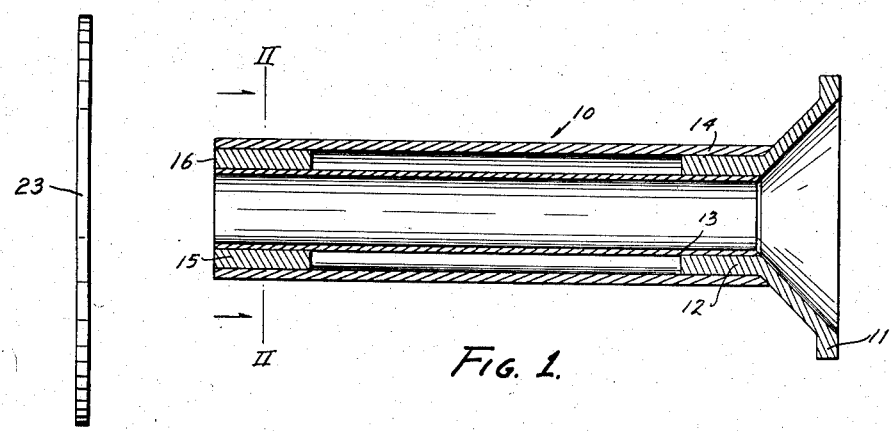
FIG. 1.
FIG. 6.
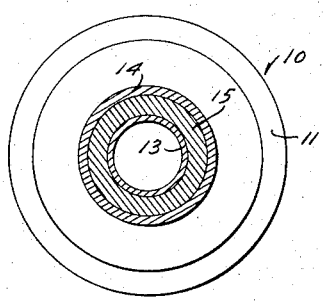
FIG. 2.
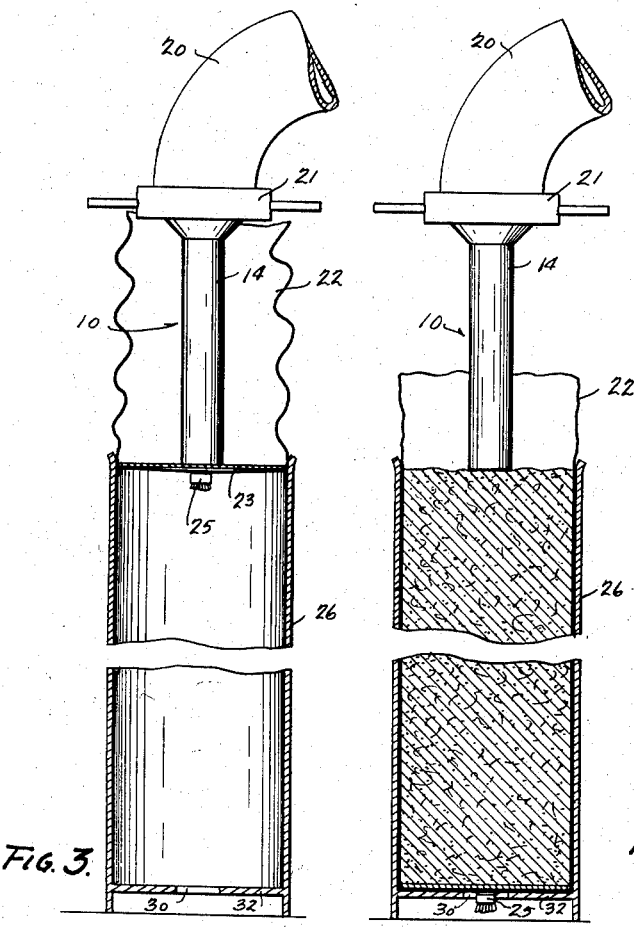
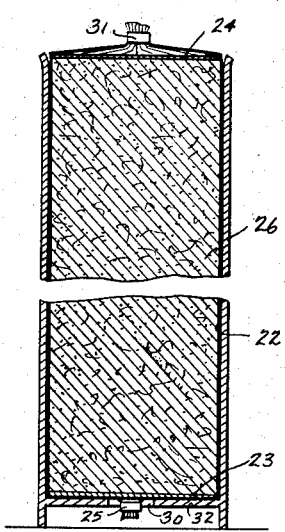
FIG. 5.
FIG. 3.     FIG. 4.
INVENTOR.
NORMAN F. BECK
BY Bean, Brooks, Buckley & Bean
ATTORNEYS

2,886,073

APPARATUS FOR FILLING A CASING WITH FOOD PRODUCTS

Norman F. Beck, Buffalo, N.Y.

Application March 12, 1957, Serial No. 645,517

3 Claims. (Cl. 141—313)

My invention relates in general to an apparatus for stuffing comminuted food products into a casing, and in particular to an apparatus whereby the stuffed casing when filled shall have a substantially uniform diameter from end to end.

It is well known that when comminuted food products are packaged in cellophane or fiber casings, the ends do not fill out to the same diameter as the body of the casing with the result that there is considerable waste because of the illy formed ends.

The principal object of my invention is to provide an apparatus whereby the food product may be packed in a casing having substantially the same diameter throughout its length.

Another object is to provide a stuffed food product which may be sliced from one end to the other, thereby avoiding any waste.

The above objects and advantages have been accomplished by the device shown in the accompanying drawings, of which:

Fig. 1 is a side sectional elevation of the stuffing horn of my device;

Fig. 2 is a sectional view thereof taken on line II—II of Fig. 1;

Fig. 3 is a sectional view showing the filling horn about to fill a casing;

Fig. 4 is a similar view showing the filling horn after filling a casing; and

Fig. 5 is a similar view showing the completed product.

Fig. 6 is an edge view of the bottom plate.

Referring to Figs. 1 and 2, my apparatus comprises in part a stuffing horn 10 consisting of an attaching flange 11 having an integral hub 12. An inner tube 13 is secured to the inside of the hub 12 and an outer tube 14 is secured to the outer surface of the hub. Both the inner and outer tubes are coextensive and a magnet 15 is disposed in the outer end of the outer tube 14 and about the inner tube 13. The magnet has its face 16 substantially flush with the outer ends of the tube 14 and 13. The inner and outer tubes are hermetically sealed to the hub 12 and to the magnet 15. The flange 11 is designed to be attached to a pipe 20 coming from any suitable stuffing machine (not shown), and is preferably detachably secured thereto by means of a coupling 21 of standard form.

As hereinbefore pointed out, it is an object of my invention to provide a package for comminuted food products having substantially the same diameter throughout its length, and to accomplish this end, I provide substantially flat rigid end plates 24 and 23, respectively, for the top and bottom of the casing 22. The bottom plate 23 is preferably of ferrous metal so that it will be held in position upon the horn by magnetism while the casing is being drawn up over the horn. These plates are of substantially the same diameter as the stuffed casing, whereby substantially flat ends are provided, thereby permitting the dealer to slice the product up to the very end and thereby avoiding the usual waste.

In order to support the casing while it is being filled, I provide a container 26 which is in form desired for the finished product and which is provided with a bottom 32 formed with a central opening 30.

Referring to Figs. 3 and 5, inclusive, the bottom plate 23 is placed against the end of the horn and is temporarily secured thereto by means of the magnet 15. The flexible casing 22, the lower end of which has been previously shirred and fastened together by means of a clip 25, can now quickly and conveniently be placed by the operator over the rigidly held bottom plate and manually drawn up over the plate and the horn. After the container 26 has been placed in registration with the bottom plate, the valve (not shown) controlling the flow of comminuted meat products to the horn is opened and the food products are caused to flow through the horn at the bottom of the casing against the plate. As food products approach the end of the horn, the bottom plate 23 is pushed away from the magnet thereby, and the plate, together with the casing, is pushed down into the container as the products are being forced into the casing. When the casing has been stuffed and the products have been completely pushed into the container, the clip 25, and the shirred bottom end of the casing will pass into the opening 30 formed in the container bottom. When the casing has been stuffed, as clearly shown in Fig. 4, the container with the filled casing is moved away from the horn and the top plate 24 is placed on top of the food product in the filled casing after which the top portion of the casing is gathered and fastened together by means of a clip 31, whereupon the finished product is removed from the container.

What is claimed is:

1. In combination with a flexible casing of a comminuted food product, of an apparatus for stuffing comminuted food products into said casing, comprising a food feeding horn, a magnet mounted on the outer end of the horn, and a plate of magnetic material disposable in the bottom of the casing by means of said horn and held in position on the end of said horn by said magnet, said plate being detachable from the horn by the pressure of the food product as said casing is filled.

2. A horn for stuffing comminuted food products, comprising an attached flange, an outer tube carried by said flange, an inner food-carrying tube mounted upon the flange and in spaced relation with the outer tube, and a magnet mounted in the outer end of the horn and disposed between the inner and outer tubes.

3. In an apparatus for stuffing a comminuted food product into a tubular pliable casing formed with substantially flat shaped ends, comprising a substantially rigid end plate of magnetic material for initial placement in the bottom of said casing, a food feeding plate-positioning horn, a magnet mounted on the food discharge end of said horn and attractively supporting said end plate within said casing to be engaged by the food being discharged thereagainst, and said plate being temporarily secured to the outer end of said horn by said magnet and displaceable therefrom with said casing in response to the pressure of the food product feeding through the horn.

References Cited in the file of this patent

UNITED STATES PATENTS

| | | |
|---|---|---|
| 425,768 | Ezell | Apr. 15, 1890 |
| 1,486,476 | Bloss | Mar. 11, 1924 |
| 2,179,676 | Vogt | Nov. 14, 1939 |
| 2,313,229 | Dyrek | Mar. 9, 1943 |
| 2,523,436 | Klaus | Sept. 26, 1950 |
| 2,619,674 | Stem | Dec. 2, 1952 |
| 2,751,306 | Synder | June 19, 1956 |

UNITED STATES PATENT OFFICE

CERTIFICATE OF CORRECTION

Patent No. 2,886,073

May 12, 1959

Norman F. Beck

It is hereby certified that error appears in the printed specification of the above numbered patent requiring correction and that the said Letters Patent should read as corrected below.

Column 2, line 44, for "attached" read -- attaching --.

Signed and sealed this 1st day of September 1959.

(SEAL)
Attest:

KARL H. AXLINE
Attesting Officer

ROBERT C. WATSON
Commissioner of Patents